(12) United States Patent
Maruyama et al.

(10) Patent No.: US 10,794,342 B2
(45) Date of Patent: Oct. 6, 2020

(54) FUEL SUPPLY DEVICE AND METHOD FOR MOUNTING AND DEMOUNTING FUEL SUPPLY DEVICE

(71) Applicants: DENSO CORPORATION, Kariya, Aichi-pref. (JP); TOYOTA JIDOSHA KABUSHIKI KAISHA, Toyota, Aichi-ken (JP)

(72) Inventors: Koji Maruyama, Kariya (JP); Shingo Fukuoka, Kariya (JP); Rui Adachi, Kariya (JP); Tetsuro Okazono, Kariya (JP); Norihiro Hayashi, Kariya (JP); Atsushi Kamiyama, Miyoshi (JP); Junichi Takatsuji, Toyota (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 76 days.

(21) Appl. No.: 16/323,003

(22) PCT Filed: Jun. 9, 2017

(86) PCT No.: PCT/JP2017/021418
§ 371 (c)(1),
(2) Date: Feb. 4, 2019

(87) PCT Pub. No.: WO2018/092338
PCT Pub. Date: May 24, 2018

(65) Prior Publication Data
US 2019/0178211 A1 Jun. 13, 2019

(30) Foreign Application Priority Data
Nov. 18, 2016 (JP) .................................. 2016-224865

(51) Int. Cl.
*F02M 37/10* (2006.01)
*F02M 37/00* (2006.01)
(Continued)

(52) U.S. Cl.
CPC ............ *F02M 37/103* (2013.01); *B60K 15/03* (2013.01); *F02M 37/00* (2013.01); *F02M 37/04* (2013.01);
(Continued)

(58) Field of Classification Search
CPC .......... B60K 15/03; B60K 2015/03217; B60K 2015/03243; B60K 2015/03453;
(Continued)

(56) References Cited

U.S. PATENT DOCUMENTS 6,000,913 A * 12/1999 Chung ................. B60K 15/077
123/509
6,716,000 B2 * 4/2004 Appleton ............. F02M 37/103
417/360

(Continued)

FOREIGN PATENT DOCUMENTS

JP 2012-184760 9/2012

*Primary Examiner* — Carl C Staubach
(74) *Attorney, Agent, or Firm* — Nixon & Vanderhye P.C.

(57) ABSTRACT

A pump unit includes an insertion guide member that extends in a longitudinal direction of the pump unit and is used to guide the pump unit at a time of inserting the pump unit into an opening portion of a fuel tank. The insertion guide member includes a stopper portion and a guide portion that are arranged along an edge part of the insertion guide member. When the pump unit is projected in the longitudinal direction onto a plane of projection, the stopper portion protrudes outward from an imaginary circle, which has a fitting portion's diameter, on the plane of projection. The guide portion guides the pump unit in a rotational direction relative to a stay. A cross section of the pump unit taken
(Continued)

LONGITUDINAL DIRECTION along a guide portion orthogonal plane is set to be within the imaginary circle, which has the fitting portion's diameter.

10 Claims, 11 Drawing Sheets

(51) Int. Cl.
*F02M 37/04* (2006.01)
*B60K 15/03* (2006.01)

(52) U.S. Cl.
CPC ... *F02M 37/10* (2013.01); *B60K 2015/03217* (2013.01); *B60K 2015/03243* (2013.01); *B60K 2015/03453* (2013.01); *B60K 2015/03467* (2013.01)

(58) Field of Classification Search
CPC ......... B60K 2015/03467; F02M 37/00; F02M 37/04; F02M 37/10; F02M 37/103
See application file for complete search history.

(56) References Cited

U.S. PATENT DOCUMENTS

| | | | |
|---|---|---|---|
| 6,761,193 B1* | 7/2004 | Cotton | F02M 37/103 |
| | | | 141/198 |
| 8,256,457 B2* | 9/2012 | Bleuel | B60K 15/073 |
| | | | 123/514 |
| 9,261,059 B2* | 2/2016 | Schoenfuss | B60K 15/03 |
| 9,752,543 B2* | 9/2017 | Ikeya | F02M 37/0047 |
| 2006/0065247 A1* | 3/2006 | Leymarie | F02M 37/106 |
| | | | 123/509 |
| 2017/0268470 A1* | 9/2017 | Murakoshi | F02M 37/10 |
| 2017/0268471 A1* | 9/2017 | Fukui | F02M 37/10 |
| 2017/0341510 A1 | 11/2017 | Kono et al. | |
| 2018/0339585 A1* | 11/2018 | Hanby | B60K 15/03 |
| 2019/0017474 A1* | 1/2019 | Adachi | F02M 63/0275 |
| 2019/0078541 A1* | 3/2019 | Kobayashi | F02M 37/10 |
| 2019/0211785 A1* | 7/2019 | Akiba | F02M 37/0011 |

* cited by examiner

FUEL SUPPLY DEVICE AND METHOD FOR MOUNTING AND DEMOUNTING FUEL SUPPLY DEVICE

CROSS REFERENCE TO RELATED APPLICATION

This application is the U.S. national phase of International Application No. PCT/JP2017/021418 filed on Jun. 9, 2017 and is based on and incorporates herein by reference Japanese Patent Application No. 2016-224865 filed on Nov. 18, 2016.

TECHNICAL FIELD

The present disclosure relates to a fuel supply device, which is configured to be mounted in an inside of a fuel tank, and a method for mounting and demounting the fuel supply device.

BACKGROUND ART

Previously, with respect to the fuel supply device to be mounted in the inside of the fuel tank, there is known a technique that limits collision of a component of the fuel supply device to the fuel tank at a mounting operation to limit damage of the component of the fuel supply device. For instance, the fuel supply device disclosed in the patent literature 1 is configured such that a float of a remaining fuel amount sensing device is located on an upper side of a lower end of a base portion of a pump unit at a mounting orientation of the fuel supply device, which is an orientation of the fuel supply device for the time of mounting the fuel supply device to the fuel tank. At the time of mounting the fuel supply device to the fuel tank, the lower end of the base portion first contacts a tank bottom surface and functions as a protector, so that contact of the float against the tank bottom surface is avoided.

According to the technique of the patent literature 1, a size of the base portion of the pump unit needs to be increased to function as the protector of the float. Therefore, a degree of freedom with respect to the installation of the fuel supply device to the fuel tank is disadvantageously limited. Furthermore, the patent literature 1 does not mention anything about work efficiency at the time of demounting the fuel supply device from the fuel tank.

CITATION LIST

Patent Literature

PATENT LITERATURE 1: JP2016-44643A

SUMMARY OF INVENTION

The present disclosure is made in view of the above disadvantage, and it is an objective of the present disclosure to provide a fuel supply device that improves work efficiency of a mounting operation and a demounting operation of the fuel supply device relative to a fuel tank while limiting a damage of a component of the fuel supply device at the time of mounting the fuel supply device to the fuel tank without causing an increase in a size of a pump unit.

According to the present disclosure, there is provided a fuel supply device configured to be mounted in an inside of a fuel tank. The fuel supply device includes a flange, a pump unit, a stay and a coupling shaft.

The flange is fittable to an opening portion of the fuel tank and has a fitting portion's diameter that corresponds to an inner diameter of the opening portion. The pump unit includes a base portion and a fuel pump, and the fuel pump is mounted to the base portion. The stay is fixed to the flange. The coupling shaft couples between the stay and the pump unit in a manner that enables relative rotation between the stay and the pump unit.

The stay is rotatable between: an upright state where the stay is held upright relative to the base portion of the pump unit, and the flange is farthest from the base portion; and a maximum tilt state where the stay is closest to the base portion of the pump unit.

The pump unit is configured such that a longitudinal direction of the pump unit coincides with a direction along a rotation plane of the stay, and the pump unit further includes an insertion guide member that extends in the longitudinal direction and is used to guide the pump unit at a time of inserting the pump unit into the opening portion of the fuel tank.

The insertion guide member includes a stopper portion and a guide portion that are arranged along an edge part of the insertion guide member, which is opposite from the base portion.

When the pump unit is projected in the longitudinal direction onto a plane of projection, the stopper portion protrudes outward from an imaginary circle, which has the fitting portion's diameter, on the plane of projection. The guide portion guides the pump unit in a rotational direction of the pump unit relative to the stay.

An imaginary plane, which is perpendicular to a tangent line at a point along the guide portion and extends through the point and intersects with the base portion at an angle corresponding to a tilt angle of the stay in the maximum tilt state, is defined as a guide portion orthogonal plane. A cross section of the pump unit taken along the guide portion orthogonal plane is set to be within the imaginary circle, which has the fitting portion's diameter.

At the mounting operation for mounting the fuel supply device to the fuel tank, when a worker inserts the pump unit in the perpendicular direction, which is perpendicular to the opening plane of the opening portion, at the maximum tilt state of the stay, the insertion is limited at the position where the stopper portion contacts an edge part of the opening portion. Thereafter, the worker can appropriately rotate the pump unit in the corresponding direction for placing the base portion in the state, in which the base portion is opposed to a bottom surface of the fuel tank, while the guide portion is in contact with the edge part of the opening portion.

Furthermore, at this time, even in a situation where it is difficult for the worker to visually recognize the bottom surface of the fuel tank, it is possible to limit a damage of the constituent component(s) of the pump unit caused by interference between the constituent component(s) of the pump unit and the bottom surface of the fuel tank or interference between the constituent component(s) of the pump unit and an inner side surface of the fuel tank.

For example, a sender gauge, which is configured to sense a level of a surface of the fuel, is desirably placed such that a clearance is ensured between the sender gauge and the bottom surface of the fuel tank and between the sender gauge and the inner side surface of the fuel tank in a state where the guide portion is in contact with the edge part of the opening portion.

Furthermore, even at the demounting operation for demounting the fuel supply device from the fuel tank, the worker can appropriately rotate the pump unit in a direction for raising the pump unit from the bottom surface of the fuel tank while the guide portion is in contact with the edge part of the opening portion.

Therefore, according to the present disclosure, the work efficiency at each of the mounting operation and the demounting operation of the fuel supply device can be improved.

Furthermore, according to the present disclosure, there is also provided a method for mounting and demounting the fuel supply device.

Here, even in a case where the insertion guide member does not protrudes outward beyond the inner diameter of the opening portion of the fuel tank on the plane of projection when the pump unit is projected in the longitudinal direction onto the plane of projection, i.e., in a case where an end part of the insertion guide member does not function as the stopper portion, the method for mounting and demounting the fuel supply device according to the present disclosure can be appropriately used.

Specifically, the worker can rotate the pump unit through use of a guide function by placing the fuel supply device to one side of the opening portion such that the guide portion is in contact with the edge part of the opening portion. Thereby, the effects and advantages, which are similar to those of the fuel supply device discussed above, can be achieved.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Hereinafter, various embodiments of a fuel supply device will be described with reference to the drawings. The fuel supply device of the embodiments is a device that is mounted to a fuel tank installed at, for example, a vehicle and supplies fuel of the fuel tank to a high pressure pump. The high pressure fuel, which is pressurized at the high pressure pump, is injected from a fuel injection valve into a cylinder or an air intake passage of an engine.

First Embodiment

A fuel supply device of the first embodiment will be described with reference to FIGS. 1 to 10. A second embodiment, which will be described later, differs from the first embodiment only with respect to a configuration of a guide portion of an insertion guide member provided to a pump unit, and a majority of description of the second embodiment is common to the first embodiment.

First of all, a configuration of a fuel supply device alone, i.e., the configuration of the fuel supply device before the time of mounting the fuel supply device to the fuel tank will be described with reference to FIGS. 1 to 3. In the description of this portion, reference signs of the fuel tank and an opening portion are the same as those indicated in FIGS. 5 to 10.

Figure 1:
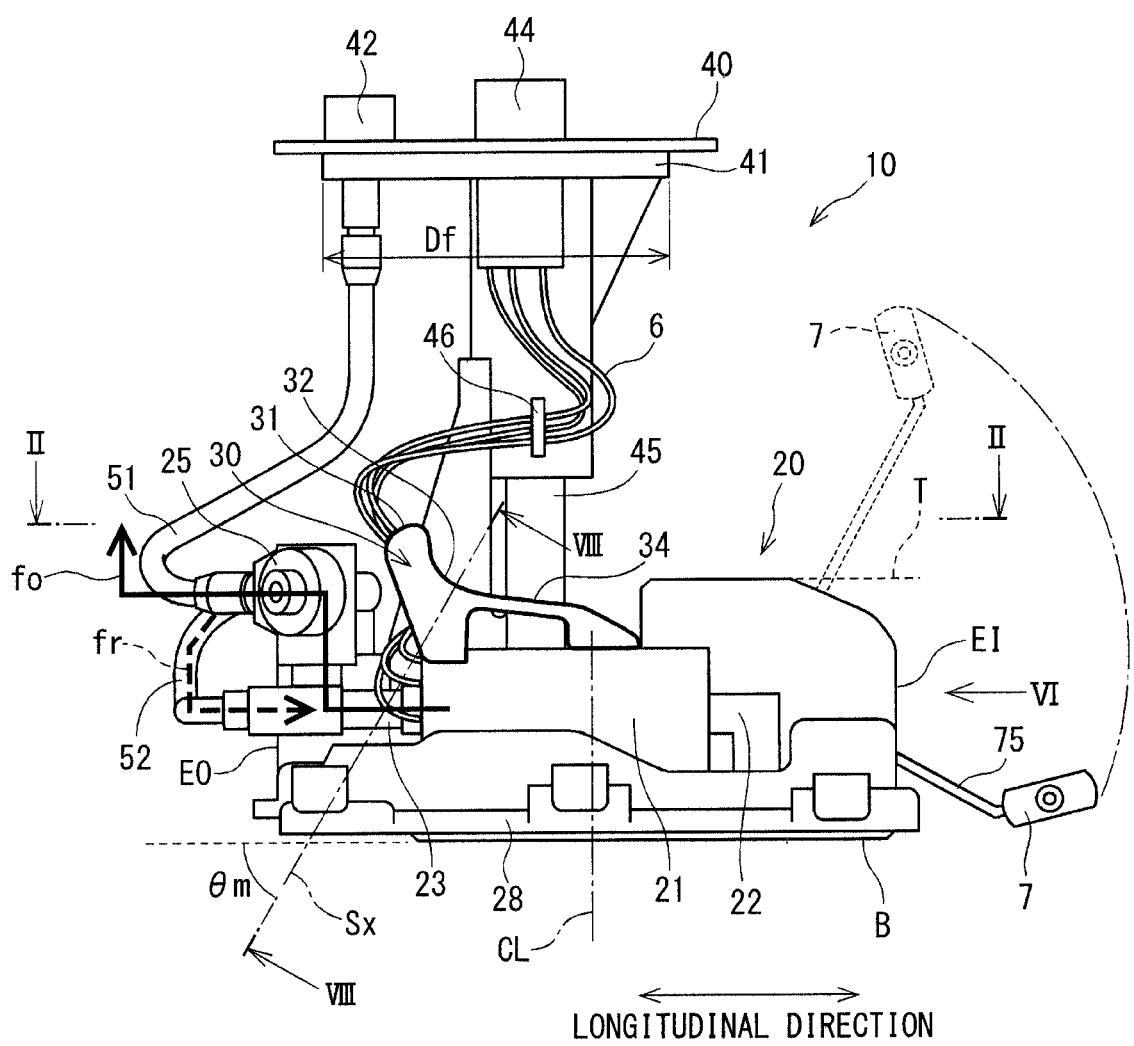
FIG. 1 is a front view of a fuel supply device according to a first embodiment.
Figure 2:
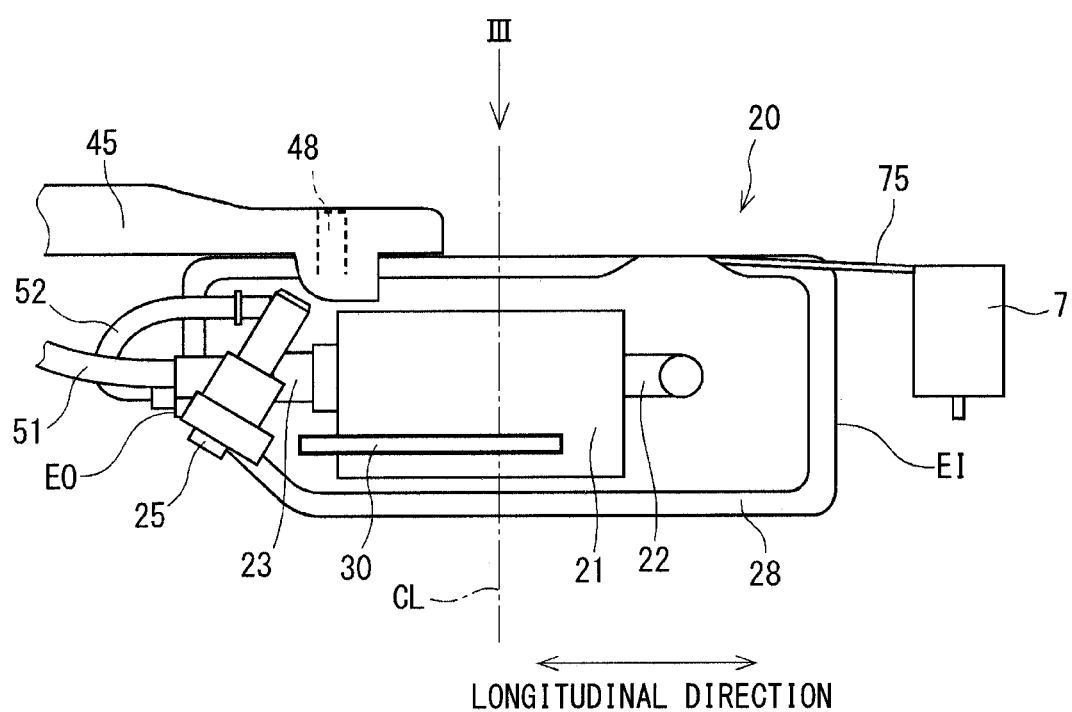
FIG. 2 is a plan view of the fuel supply device of FIG. 1 in a maximum tilt state of a stay.
Figure 3:
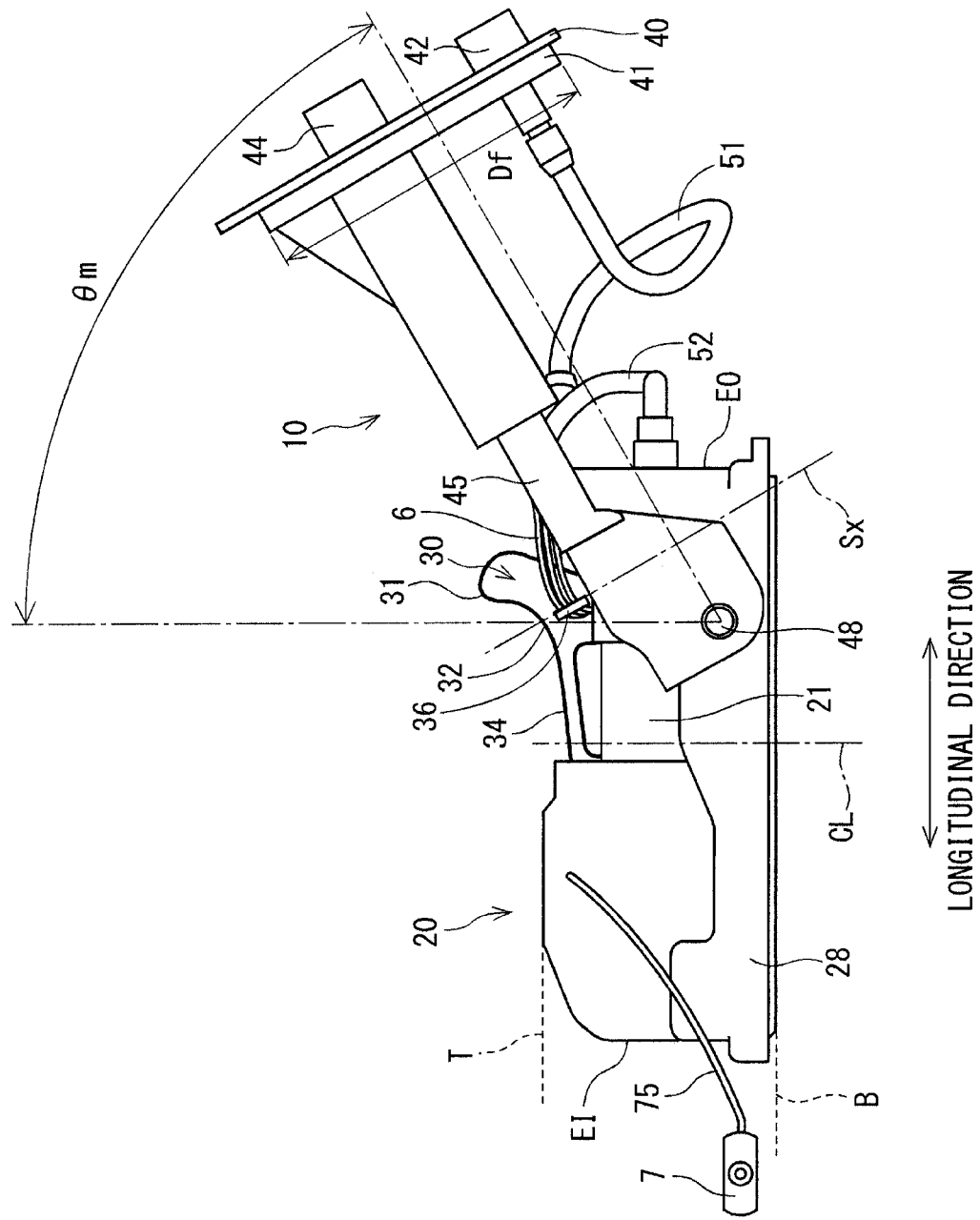
FIG. 3 is a back view of the fuel supply device of FIG. 1 in the maximum tilt state of the stay.

As shown in FIGS. 1 to 3, the fuel supply device 10 of the first embodiment includes a pump unit 20, a flange 40, a stay 45, a coupling shaft 48, connection tubes 51, 52, a wire harness 6 and a sender gauge 7. Hereinafter, an upper side and a lower side of FIGS. 1 to 3 will be described as an upper side and a lower side, respectively.

An overall silhouette of the pump unit 20 is in a form of generally a parallelepiped while a base portion 28 forms a bottom plane B of the parallelepiped, and a longitudinal direction of the parallelepiped is defined as a longitudinal direction of the pump unit 20. In FIGS. 1 to 3, a center line CL indicates generally a center in the longitudinal direction. An imaginary plane of a portion, which is highest from the bottom plane B except the insertion guide member 30 described later and is parallel with the bottom plane B, is defined as a top plane T.

A fuel pump 21, which is shaped generally into a cylindrical form, is mounted to the base portion 28 such that an axis of the cylindrical form extends in the longitudinal direction of the pump unit 20. The fuel pump 21 pressurizes fuel, which is drawn through a suction flow passage 22 placed at one side in the longitudinal direction, and the fuel pump 21 discharges the pressurized fuel from a discharge flow passage 23, which is placed at the other side in the longitudinal direction. An end part of the pump unit 20, which is located on the suction flow passage 22 side in the longitudinal direction, will be referred to as a suction-side end part EI, and the other end part of the pump unit 20, which is located on the discharge flow passage 23 side in the longitudinal direction, will be referred to as a discharge-side end part EO.

The sender gauge 7 is connected to the suction-side end part EI of the pump unit 20 through a gauge arm 75. In a state where the pump unit 20 is placed in the inside of the fuel tank 80, the sender gauge 7 senses a level of a surface of the fuel. The sender gauge 7 is rotatable as indicated by a broken line in FIG. 1 by buoyancy generated at a float according to the level of the surface of the fuel.

A relief valve 25, which adjusts a discharge pressure of the fuel pump 21, is installed at the discharge-side end part EO of the pump unit 20. The adjustment of the pressure by the relief valve 25 includes a case where only an upper limit pressure is limited, and a case where the pressure is adjusted within an upper-to-lower limit range.

The discharge connection tube 51 forms a fuel passage, which extends from the relief valve 25 to a discharge port 42 provided at a flange 40. The return connection tube 52 forms a fuel passage for returning the fuel from the relief valve 25.

As indicated by a solid line arrow fo, the fuel of the specified pressure among the fuel discharged from the fuel pump 21 is pumped to the discharge port 42 through the discharge connection tube 51. The fuel corresponding to the excess pressure is returned to the discharge flow passage 23 through the return connection tube 52, as indicated by a broken line arrow fr.

The flange 40 is fittable to an opening portion 81 of the fuel tank 80. For instance, a fitting portion 41, which is shaped into a ring form, is fitted to a radially inner side of the opening portion 81. Specifically, a fitting portion's diameter Df corresponds to an opening portion's inner diameter Do of the fuel tank 80. The fitting portion 41 is not necessarily in a form of a perfect ring and may be formed by a plurality of arcuate parts, which are intermittently arranged. In such a case, a total circumferential length of the arcuate parts is preferably equal to or larger than one half of a circumferential extent of a circle.

The stay 45 is fixed to the flange 40 and extends from the flange 40 toward the pump unit 20. As shown in FIG. 3, an opposite end part of the stay 45, which is opposite from the flange 40, is rotatably coupled to the pump unit 20. The coupling shaft 48 is formed by a shaft portion, which is formed at one of the pump unit 20 and the stay 45 and is fitted into a hole formed in the other one of the pump unit 20 and the stay 45. In the present embodiment, the coupling shaft 48 is located on a side of the longitudinal center CL of the pump unit 20, at which the discharge-side end part EO is placed.

In the state shown in FIG. 1, the flange 40 is placed on the upper side of the pump unit 20 through the stay 45, which is held upright. In the state shown in FIGS. 2 and 3, the stay 45 is tilted at a maximum degree toward the discharge-side end part EO side, and a height difference between the flange 40 and the pump unit 20 is minimized.

The state shown in FIG. 1 is referred to as an upright state of the stay 45, and the state shown in FIGS. 2 and 3 is referred to as a maximum tilt state of the stay 45. A tilt angle of the stay 45 in the maximum tilt state relative to the upright state is referred to as a maximum tilt angle θm.

In the upright state, the stay 45 is held upright relative to the base portion 28 of the pump unit 20, and the flange 40 is farthest from the base portion 28. At this time, the flange 40 is parallel to the bottom plane B of the base portion 28. In the maximum tilt state, the stay 45 is closest to the base portion 28 of the pump unit 20. The stay 45 is rotatable between the upright state and the maximum tilt state.

Here, a rotation plane of the stay 45 is defined as an imaginary plane, along which the stay 45 is rotated. In the present embodiment, the longitudinal direction of the pump unit 20 is generally parallel to the rotation plane of the stay 45.

Furthermore, the wire harness 6 extends from a connector 44 of the flange 40 along the stay 45. The wire harness 6 transmits signals, such as a drive signal of the fuel pump 21, which is inputted from an external control device, and a measurement signal, which is outputted from the sender gauge 7 and indicates a remaining fuel amount.

A portion of the wire harness 6, which is placed along the stay 45, is held by a clamp portion 46 that is placed at the stay 45, and another portion of the wire harness 6, which is placed along the pump unit 20, is held by clamp portions 35, 36 (see FIGS. 3 and 4) that are placed at the pump unit 20. The portion of the wire harness 6, which is placed along the stay 45, is rotated together with the stay 45. Furthermore, an intermediate portion of the wire harness 6, which is located between the portion of the wire harness 6 placed along the stay 45 and the other portion of the wire harness 6 placed along the pump unit 20, is loosely arranged to follow the rotation of the stay 45.

In FIG. 2, the wire harness 6 is not depicted for the sake of simplicity.

Figure 4:
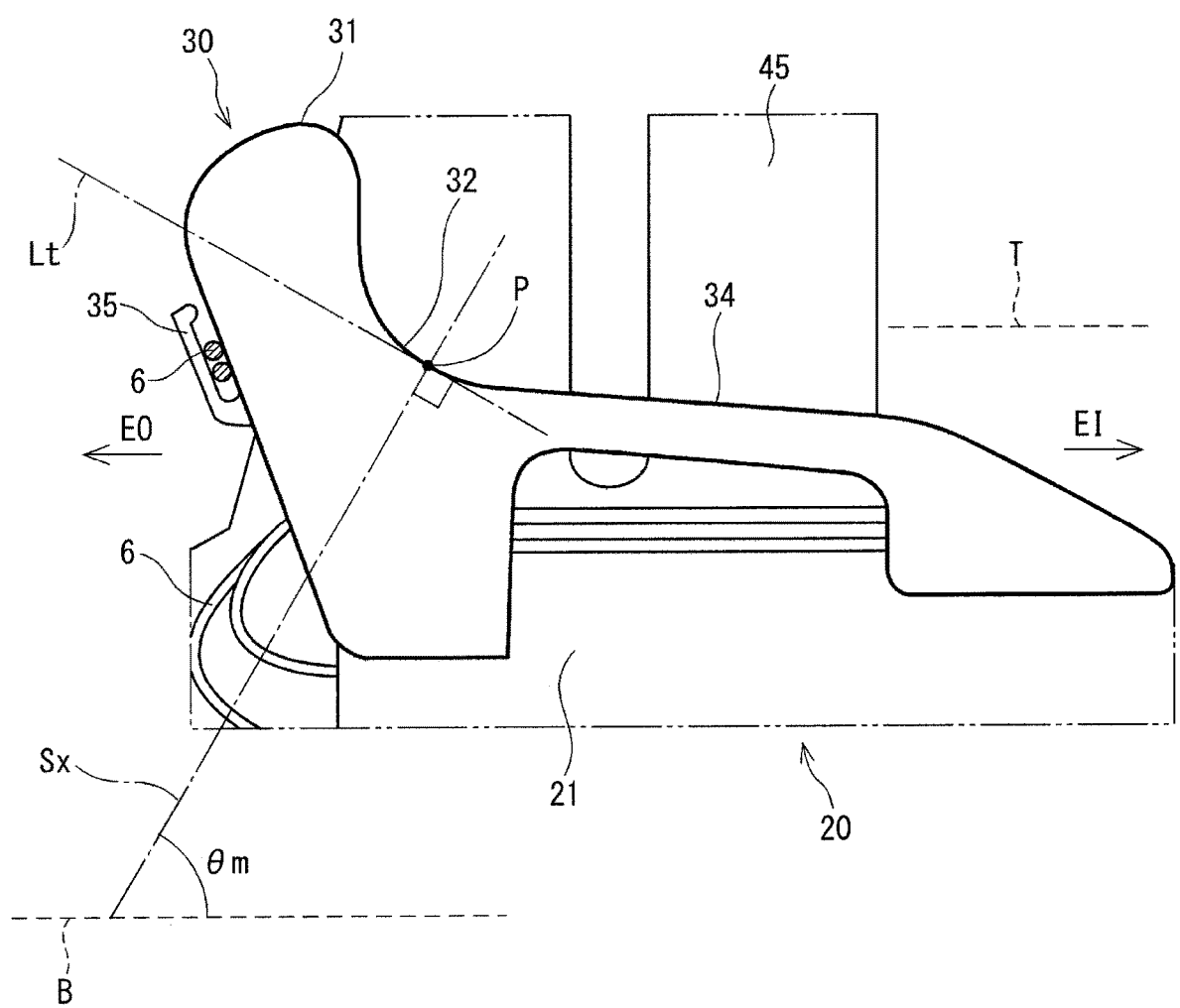
FIG. 4 is an enlarged view of an insertion guide member of the fuel supply device shown FIG. 1.
Figure 6:
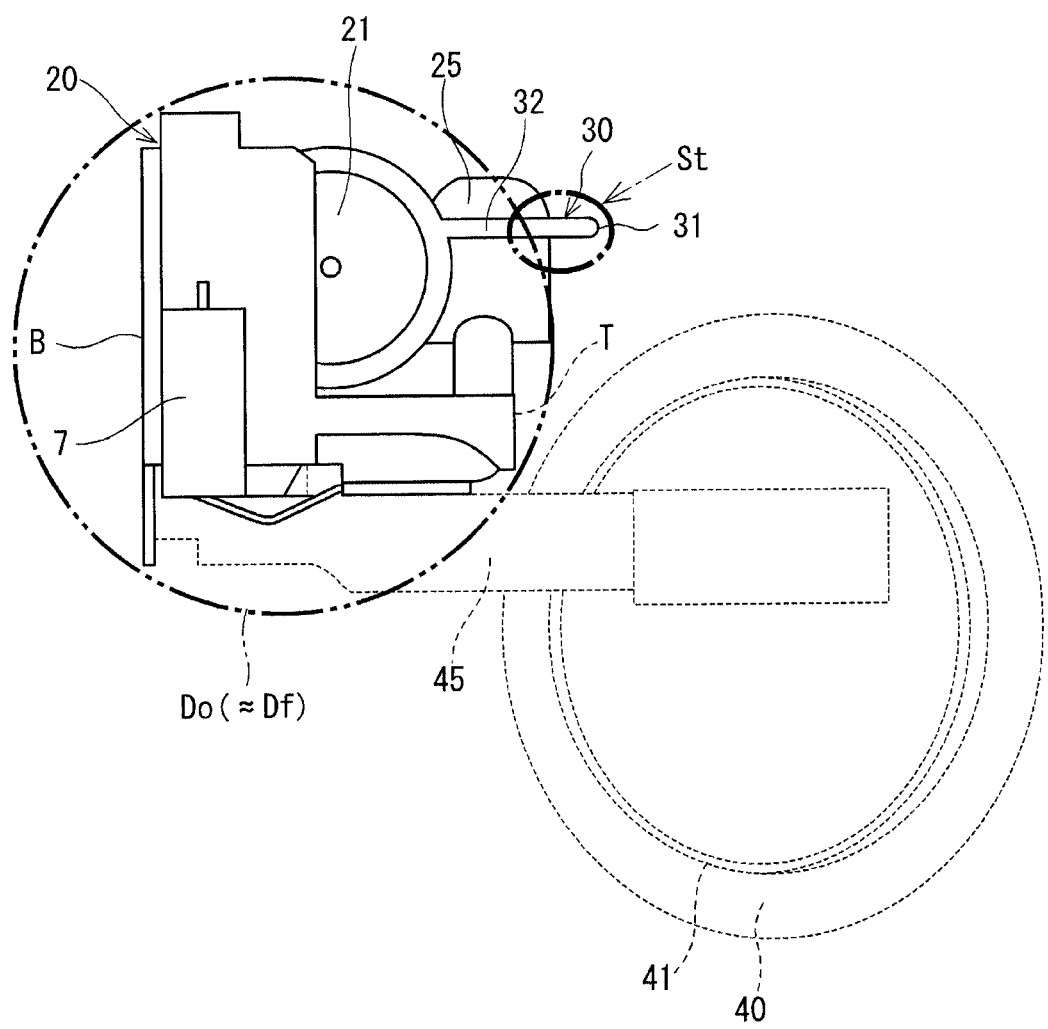
FIG. 6 is a view taken in a direction of an arrow VI in FIG. 5.
Figure 8:
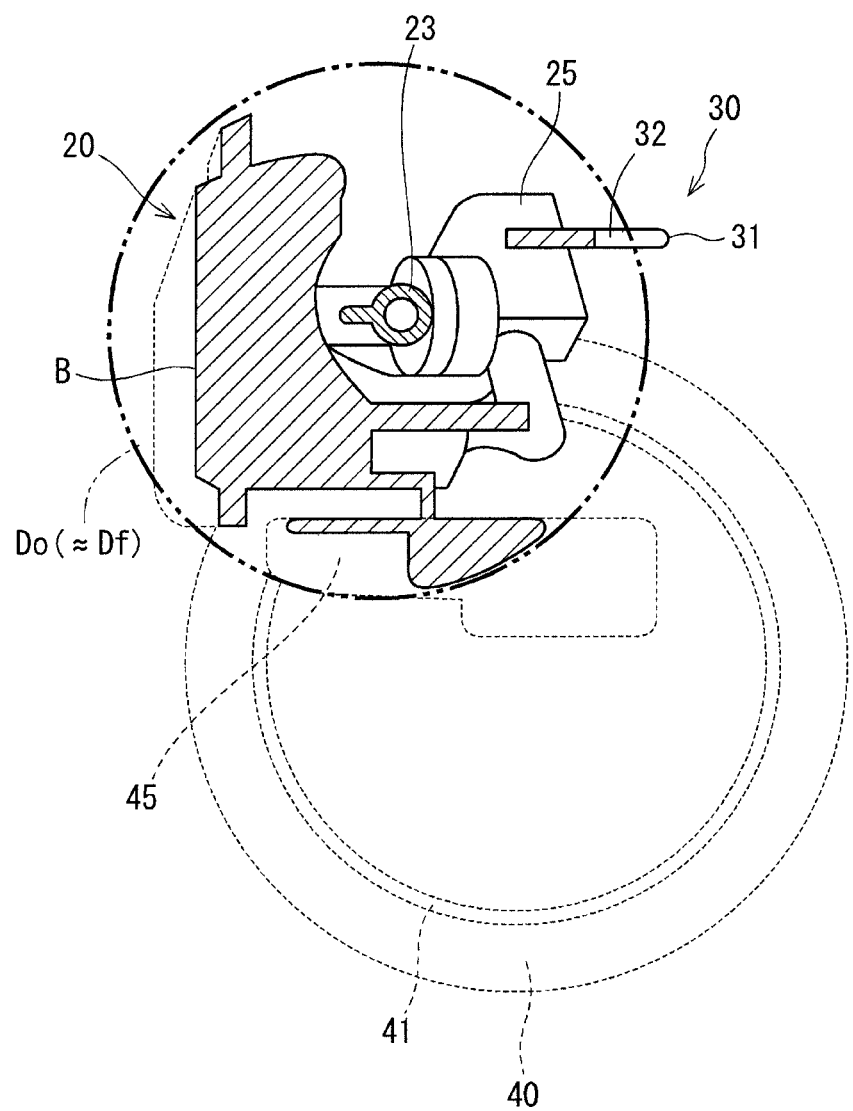
FIG. 8 is a cross-sectional view taken along line VIII-VIII (a guide portion orthogonal plane Sx) in FIG. 7.

Next, reference is made to FIGS. 4, 6 and 8 in addition to FIGS. 1 to 3. An insertion guide member 30 is placed at the upper side of the fuel pump 21 of the pump unit 20. The insertion guide member 30 is shaped into a plate form that extends in the longitudinal direction, and the insertion guide member 30 is used for guiding the pump unit 20 at the time of inserting the pump unit 20 into the opening portion 81 of the fuel tank 80. The insertion guide member 30 is not necessarily limited to an independent member formed independently relative to the pump unit 20 but may be integrally formed in one piece with another portion of the pump unit 20.

The insertion guide member 30 includes a stopper portion 31, a guide portion 32 and an extending portion 34, which are arranged in this order along an upper edge part of the insertion guide member 30, i.e., along an opposite edge part of insertion guide member 30, which is opposite from the base portion 28, from the discharge-side end part EO side toward the suction-side end part EI.

The stopper portion 31 projects to a position that is higher than the top plane T at the discharge-side end part EO side.

The extending portion 34 gradually rises from the suction-side end part EI side toward the discharge-side end part EO at a position that is lower than the top plane T.

The guide portion 32 is placed adjacent to the stopper portion 31 and connects between the stopper portion 31 and the extending portion 34. Particularly in the first embodiment, an outline of the guide portion 32 is formed by a curve line. The guide portion 32 guides the pump unit 20 in a rotational direction relative to the stay 45.

FIG. 6 shows a plane of projection, onto which the pump unit 20 is projected in the longitudinal direction, while the plane of projection is seen from the suction-side end part EI side. In FIG. 6, a dot-dot-dash line circle indicates an imaginary circle that has the opening portion's inner diameter Do of the fuel tank 80, or the fitting portion's diameter Df of the flange 40, which corresponds to the opening portion's inner diameter Do. As indicated at a portion St in FIG. 6, the stopper portion 31 protrudes outward from the imaginary circle that has the fitting portion's diameter Df on the plane of projection.

This means that when the pump unit 20 is moved in the longitudinal direction, the stopper portion 31 interferes with the edge part of the opening portion 81 and fulfills a stopper function.

Furthermore, as shown in FIG. 4, an imaginary plane, which is perpendicular to a tangent line Lt at a point P along the guide portion 32 and extends through the point P and intersects with the base portion 28 at an angle corresponding to the maximum tilt angle θm, is defined as a guide portion orthogonal plane Sx. In FIG. 8 that indicates a cross section of the pump unit 20 along the guide portion orthogonal plane Sx, the cross section of the pump unit 20 is received within the imaginary circle that has the fitting portion's diameter Df.

This means that the cross section of the pump unit 20 can pass through the opening portion 81 in a state where the pump unit 20 is tilted such that the guide portion orthogonal plane Sx coincides with an opening plane So of the opening portion 81 of the fuel tank 80.

At a mounting operation for mounting the fuel supply device 10 to the fuel tank 80, a worker can smoothly rotate the pump unit 20 relative to the stay 45 along the curved guide shape while the guide portion 32 is in contact with the edge part of the opening portion 81 though the guide function of the guide portion 32.

As described above, the insertion guide member 30 of the present embodiment has the stopper function, which is implemented by the stopper portion 31, and the guide function, which is implemented by the guide portion 32. Because of these functions, the work efficiency of the mounting operation for mounting the fuel supply device 10 to the fuel tank 80 and the demounting operation for demounting the fuel supply device 10 from the fuel tank 80 is improved. Details of these operations will be described later.

The positional relationship between the guide portion 32 of the insertion guide member 30 and other members will be supplementary described.

As shown in FIG. 3, the guide portion 32 is located on the side of the longitudinal center CL of the pump unit 20, at which the coupling shaft 48 is placed.

The stay 45 is tilted away from the guide portion 32 toward the base portion 28 side at the maximum tilt state. Thereby, the portion of the wire harness 6, which is rotated together with at least the stay 45, is placed on the side of the guide portion 32 of the insertion guide member 30, at which the base portion 28 is placed, in the maximum tilt state of the stay 45.

The relief valve 25 is placed on an opposite side of the stopper portion 31 of the insertion guide member 30, which is opposite from the guide portion 32. In other words, in the maximum tilt state of the stay 45, the relief valve 25 is placed on the flange 40 side of the guide portion orthogonal plane Sx.

At least a portion of the discharge connection tube 51 and at least a portion of the return connection tube 52 are placed on an opposite side of the guide portion 32, which is opposite from the longitudinal center CL of the pump unit 20. In other words, in the maximum tilt state of the stay 45, at least the portion of the discharge connection tube 51 and at least the portion of the return connection tube 52 are placed on the flange 40 side of the guide portion orthogonal plane Sx.

[Method for Mounting and Demounting Fuel Supply Device]

Next, a mounting method for mounting the fuel supply device 10 of the present embodiment to the fuel tank 80 and a demounting method for demounting the fuel supply device 10 from the fuel tank 80 will be described with reference to FIGS. 5 to 10.

In this description, for the sake of convenience, the opening portion 81 side of the fuel tank 80 is referred to as an upper side, and the bottom surface 82 side of the fuel tank 80 is referred to as a lower side. Furthermore, it is assumed that the opening plane So of the opening portion 81 and the bottom surface 82 are placed parallel to the horizontal plane, and a direction, which is perpendicular to the opening plane So, is referred to a perpendicular direction. A solid line block arrow, which extends in the perpendicular direction in FIGS. 5, 9 and 10, indicates a direction of a load F at the time of mounting operation.

<First Mounting Stage>

Figure 5:
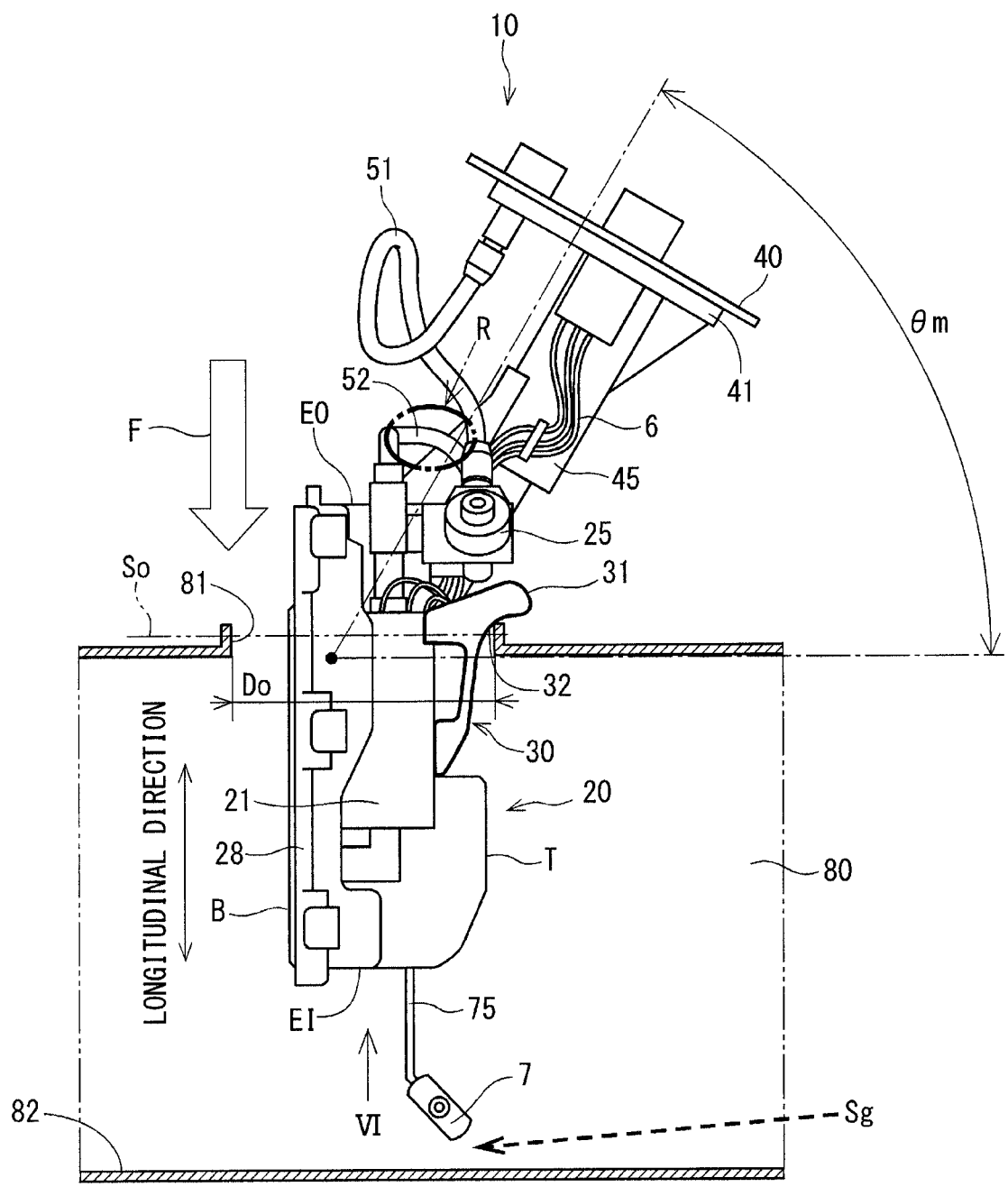
FIG. 5 is a diagram indicating a first mounting stage of a mounting method and a third demounting stage of a demounting method of the fuel supply device shown in FIG. 1.

The following description will be made with reference to FIGS. 5 and 6. While the pump unit 20 is postured such that the suction-side end part EI, which is placed at the longitudinal end of the pump unit 20, is directed downward in the maximum tilt state of the stay 45, the worker inserts the pump unit 20 into the opening portion 81 in the perpendicular direction. As shown in FIG. 6, since the stopper portion 31 of the insertion guide member 30 protrudes outward from the imaginary circle that has the opening portion's inner diameter Do, the insertion of the pump unit 20 in the perpendicular direction is limited at the position where the stopper portion 31 contacts the edge part of the opening portion 81.

At this time, as indicated at a portion Sg, a clearance between the sender gauge 7 and the bottom surface (hereinafter referred to as a tank bottom surface) 82 of the fuel tank 80 is ensured. Furthermore, a clearance between the sender gauge 7 and each of two opposed inner side surfaces of the fuel tank 80 in a front-to-back direction of a plane of FIG. 5 is ensured.

<Second Mounting Stage>

Figure 7:
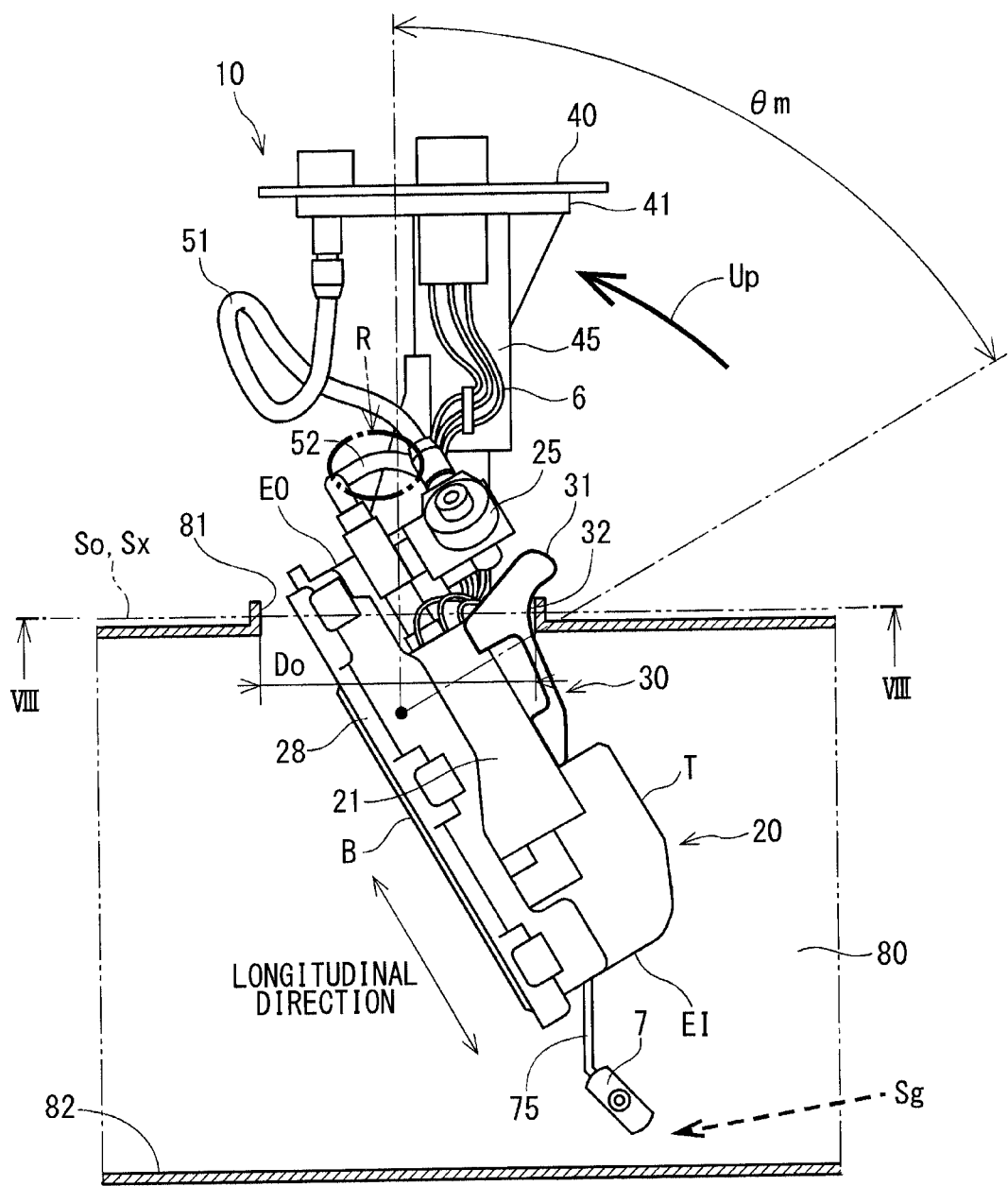
FIG. 7 is a diagram indicating a second mounting stage of the mounting method and a second demounting stage of the demounting method.

The following description will be made with reference to FIGS. 7 and 8. After the first mounting stage, the worker places the guide portion 32 of the insertion guide member 30 in contact with the edge part of the opening portion 81 and rotates the fuel supply device 10 in a direction of an arrow Up along the guide portion 32 such that the flange 40 is placed in parallel with the horizontal plane. As shown in FIG. 8, the cross section of the pump unit 20 at the guide portion orthogonal plane Sx is configured to be received within the imaginary circle that has the opening portion's inner diameter Do, i.e., is configured to pass through the opening portion 81.

Even at this time, as indicated at the portion Sg, the guide portion 32 ensures the presence of the clearance between the sender gauge 7 and the tank bottom surface 82 and the clearance between the sender gauge 7 and each of the two opposed inner side surfaces of the fuel tank 80.

<Third Mounting Stage>

Figure 9:
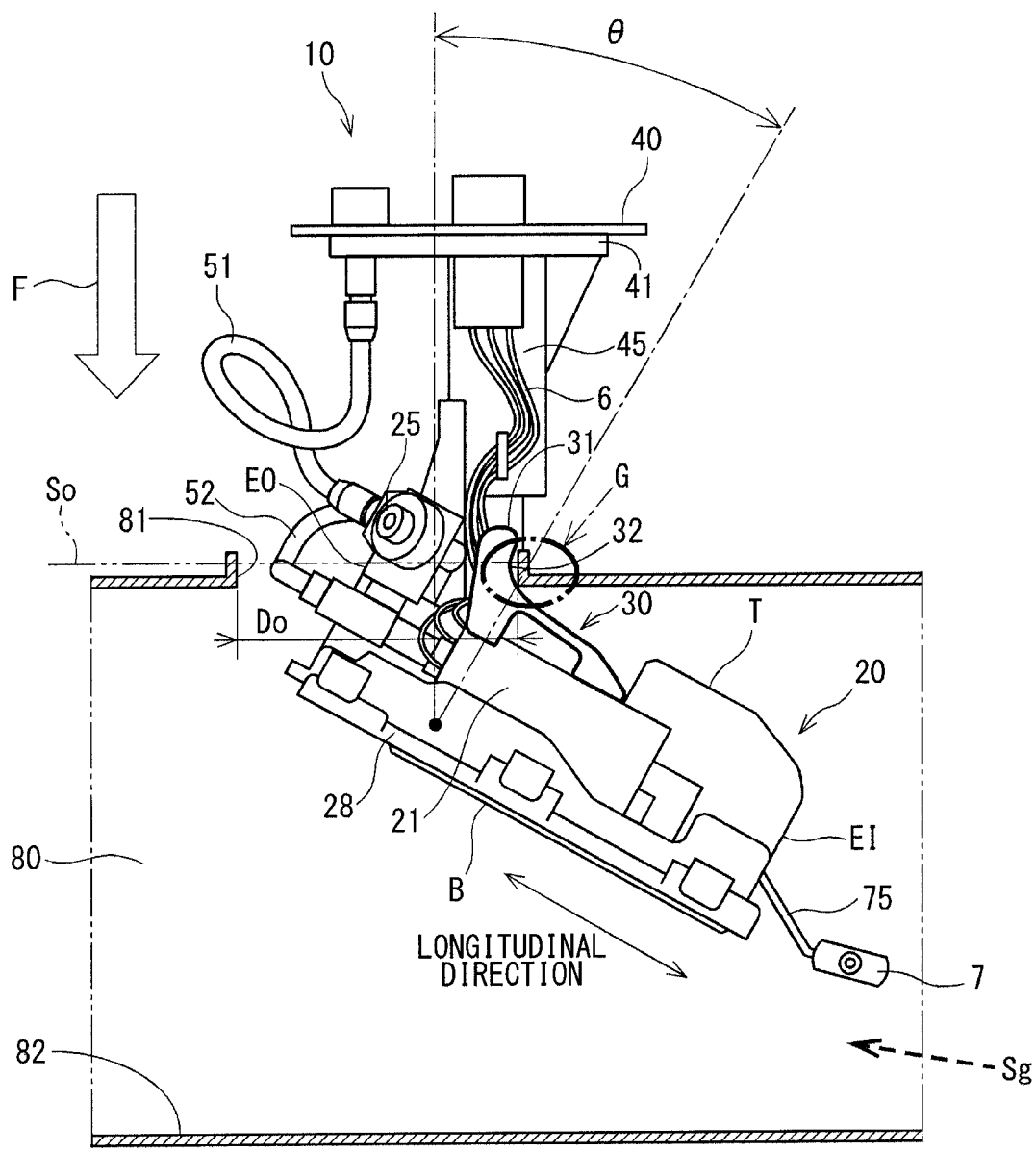
FIG. 9 is a diagram indicating a third mounting stage of the mounting method and a first demounting stage of the demounting method.

The following description will be made with reference to FIG. 9. After the second mounting stage, the worker downwardly applies a load F in the perpendicular direction against the flange 40 and the stay 45 while the guide portion 32 is in contact with the edge part of the opening portion 81 as shown in a portion G. Then, because of the guide function of the guide portion 32, the pump unit 20 is rotated relative to the stay 45 in a direction for placing the longitudinal direction in parallel with the horizontal plane, i.e., in a direct for placing the base portion 28 in a state, in which the base portion 28 is opposed to the tank bottom surface 82. Thereby, the tilt angle θ of the stay 45 is progressively reduced.

Even at this time, as indicated at the portion Sg, the guide portion 32 ensures the presence of the clearance between the sender gauge 7 and the tank bottom surface 82 and the presence of the clearance between the sender gauge 7 and each of the two opposed inner side surfaces of the fuel tank 80.

<Mounting Completion Stage>

Figure 10:
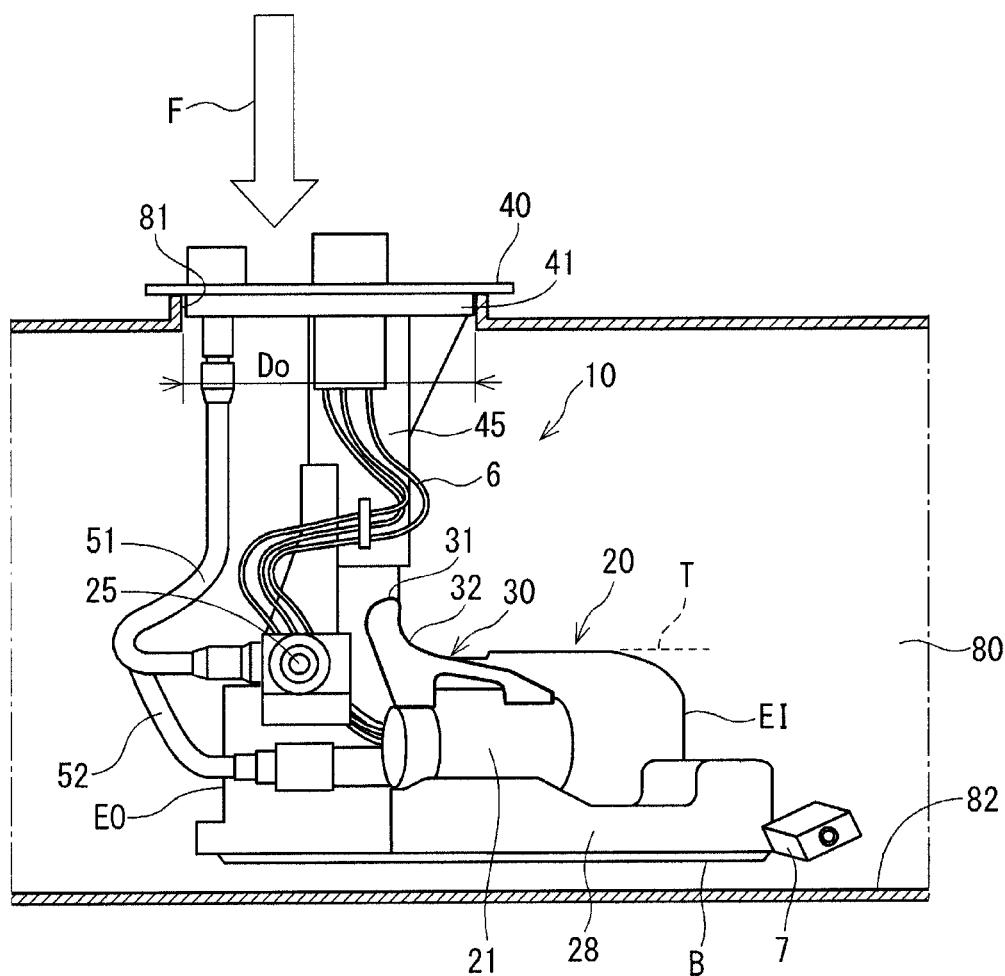
FIG. 10 is a diagram showing a mounting completion stage of the mounting method.

The following description will be made with reference to FIG. 10. After the third mounting stage, the worker further inserts the fuel supply device 10 into the fuel tank 80 to a position where the fitting portion 41 of the flange 40 is fitted to the opening portion 81.

When the mounting operation of the fuel supply device 10 is completed, the pump unit 20 is placed such that the longitudinal direction of the pump unit 20 coincides with the horizontal plane, and the base portion 28 is placed along the tank bottom surface 82. The stay 45 is placed in the upright state where the tilt angle θ is zero.

The demounting method of the fuel supply device 10 is basically executed by reversely executing the stages of the mounting method and will be described with reference to FIGS. 9, 7 and 5 once again. In FIGS. 7 and 5, a portion R, in which the return connection tube 52 is shown, indicates particularly a point of attention in the demounting operation.

<First Demounting Stage>

The following description will be made with reference to FIG. 9. As indicated at the portion G, the worker pulls up the flange 40 until the guide portion 32 of the insertion guide member 30 contacts the edge part of the opening portion 81. Then, while the guide portion 32 is in contact with the edge part of the opening portion 81, the pump unit 20 is rotated in a direction for raising the pump unit 20 from the tank bottom surface 82, i.e., a direction for progressively increasing the tilt angle θ of the stay 45.

<Second Demounting Stage>

The following description will be made with reference to FIG. 7. When the pump unit 20 is rotated to the maximum tilt state of the stay 45 after the first demounting stage, a discharge-side end part EO, which is the other longitudinal end part of the pump unit 20 and is directed toward the upper side through the rotation, is exposed to the outside of the opening portion 81. At this time, as indicated at the portion R, the return connection tube 52, which is in a handle-like form, is joined to a main body of the pump unit 20 at the discharge-side end part EO of the pump unit 20. Therefore, the worker can grasp and raise the return connection tube 52 to ease the pulling up of the pump unit 20.

<Third Demounting Stage>

The following description will be made with reference to FIG. 5. After the second demounting stage, the worker rotates the whole fuel supply device 10 such that the longitudinal direction of the pump unit 20 coincides with the perpendicular direction in the maximum tilt state of the stay 45. Then, when the guide portion 32 is detached from the edge part of the opening portion 81, the worker pulls up the pump unit 20 in the perpendicular direction. Even in this stage, the worker can grasp and raise the return connection tube 52, which is shown at the portion R and serves as the handle.

As discussed above, in the method for mounting and demounting the fuel supply device 10 according to the present embodiment, the worker can appropriately rotate the pump unit 20 in the inside of the fuel tank 80 while the guide portion 32 is in contact with the edge part of the opening portion 81. Furthermore, it is possible to avoid the damage that would be otherwise generated through the contact of the sender gauge 7 against the tank bottom surface 82 at the time of inserting the fuel supply device 10. Furthermore, at the time of demounting, the worker can grasp and raise the return connection tube 52 that is installed to the discharge-side end part, which is placed at the longitudinal end of the pump unit 20. Therefore, the work efficiency is improved.

Advantages

The effects and advantages of the fuel supply device 10 of the present embodiment will be described in relation to the claims. Each parenthesized number indicates the corresponding claim number. The advantage (2) will be described as the advantage of the first embodiment.

(1) In the fuel supply device 10 of the present embodiment, the insertion guide member 30, which is provided to the pump unit 20, includes the stopper portion 31 and the guide portion 32.

At the mounting operation for mounting the fuel supply device 10 to the fuel tank 80, the worker inserts the pump unit 20 into the opening portion 81 in the perpendicular direction, which is perpendicular to the opening plane So of the opening portion 81, while the stay 45 is placed in the maximum tilt state. At this time, the insertion is limited at the position where the stopper portion 31 contacts the edge part of the opening portion 81. Thereafter, the worker can appropriately rotate the pump unit 20 in a direction for placing the base portion 28 in a state, in which the base portion 28 is opposed to the tank bottom surface 82, while the guide portion 32 is in contact with the edge part of the opening portion 81.

Furthermore, at this time, even in a situation where it is difficult for the worker to visually recognize the bottom surface 82 of the fuel tank 80, it is possible to limit a damage of the constituent component(s) of the pump unit 20 caused by interference between the constituent component(s) of the pump unit 20 and the bottom surface and/or the inner side surface of the fuel tank 80.

Furthermore, even at the demounting operation for demounting the fuel supply device 10 from the fuel tank 80, the worker can appropriately rotate the pump unit 20 in a direction for raising the pump unit 20 from the tank bottom surface 82 while the guide portion 32 is in contact with the edge part of the opening portion 81.

Therefore, in the present embodiment, the work efficiency at each of the mounting operation and the demounting operation of the fuel supply device 10 can be improved.

(2) In the first embodiment, the outline of the guide portion 32 is formed by the curve line.

Thereby, the pump unit 20 can be smoothly guided while the guide portion 32 is in contact with the edge part of the opening portion 81.

(4) In the present embodiment, the relief valve 25 is placed on the opposite side of the stopper portion 31 of the insertion guide member 30, which is opposite from the guide portion 32.

Thereby, at the mounting operation for mounting the fuel supply device 10 to the fuel tank 80, it is possible to limit the interference between the relief valve 25 and the edge part of the opening portion 81.

(5) In the present embodiment, the stay 45 is tilted away from the guide portion 32 toward the base portion 28 of the pump unit 20 in the maximum tilt state.

In this way, at the mounting operation for mounting the fuel supply device 10 to the fuel tank 80, the guide portion 32 is brought into contact with the edge part of the opening portion 81 before occurrence of the contact of the stay 45 to the edge part of the opening portion 81, so that the guide portion 32 can implement the guide function.

(6) In the present embodiment, the portion of the wire harness 6, which is rotated together with at least the stay 45, is placed on the side of the guide portion 32, at which the base portion 28 of pump unit 20 is placed in the maximum tilt state of the stay 45.

Thereby, at the mounting operation for mounting the fuel supply device 10 to the fuel tank 80, it is possible to limit the interference between the wire harness 6 and the edge part of the opening portion 81.

(7) In the present embodiment, the guide portion 32 is located on the side of the longitudinal center CL of the pump unit 20, at which the coupling shaft 48 is placed.

By placing the guide portion 32 near the coupling shaft 48, the momentum of the pump unit 20 at the time of rotating the pump unit 20 along the guide portion 32 can be reduced.

(8) In the present embodiment, at least the portion of each connection tube 51, 52, which forms the fuel passage, is placed on the opposite side of the guide portion 32 of the insertion guide member 30, which is opposite from the longitudinal center CL of the pump unit 20, i.e., is placed on the side of the guide portion 32, at which the discharge-side end part EO is placed.

By placing the connection tubes 51, 52 on the discharge-side end part EO side that is directed toward the upper side at the time of demounting the fuel supply device 10 from the fuel tank 80, the worker can grasp the connection tubes 51, 52 and raise the pump unit 20, so that the work efficiency of the demounting operation is improved.

(9) In the present embodiment, the sender gauge 7 is placed such that the clearance between the sender gauge 7 and the bottom surface 82 and the clearance between the sender gauge 7 and each of the inner side surfaces of the fuel tank 80 are ensured in the state where the fuel tank 80 is in parallel with the horizontal plane while the guide portion 32 is in contact with the opening portion 81.

Thereby, at the mounting operation for mounting the fuel supply device 10, interference between the sender gauge 7 and the bottom surface 82 or the inner surface of the fuel tank 80 is limited, and thereby damage of the sender gauge 7 is limited.

Furthermore, the advantage of the method for mounting the fuel supply device 10 to the fuel tank 80 and the method for demounting the fuel supply device 10 from the fuel tank 80 according to the present embodiment is the same as the advantage (1) discussed above.

For example, in the prior art technique disclosed in the patent literature 1 (JP2016-44643A), it is necessary to increase the size of the base portion of the pump unit to function as the protector of the float, so that a degree of freedom with respect to the installation to the fuel tank is disadvantageously limited. In contrast, in the present embodiment, without increasing the size of the pump unit, the damage of the component(s) at the mounting operation to the fuel tank can be limited, and the work efficiency of the mounting operation and the demounting operation can be improved.

Second Embodiment

Figure 11:
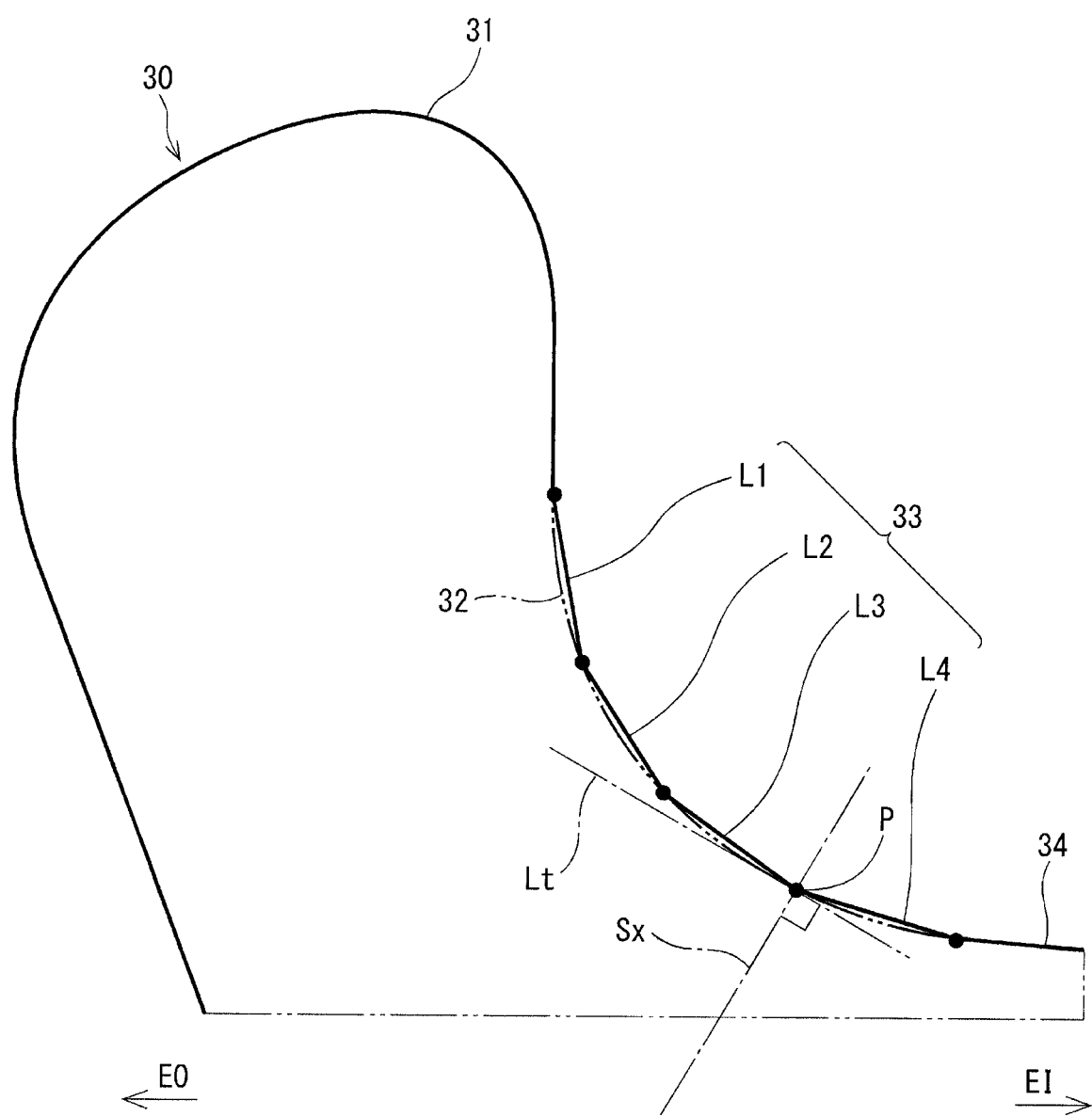
FIG. 11 is an enlarged view of a guide portion according to a second embodiment.

A second embodiment with respect to the shape of the guide portion of the insertion guide member 30 will be described with reference to FIG. 11. In FIG. 11, a solid line indicates an outline of the guide portion 33 according to the second embodiment, and a dot-dot-dash line indicates the outline of the guide portion 32 of the first embodiment shown in FIG. 4. The outline of the guide portion 32 of the first embodiment is formed by the curve line. In contrast, the outline of the guide portion 33 of the second embodiment is formed by a combination of a plurality of straight lines L1, L2, L3, L4, slopes of which change progressively. For example, each of the straight lines L1, L2, L3, L4 is defined by linear interpolation between corresponding adjacent points on the curve of the dot-dot-dash line.

The tangent line Lt at the point P, which defines the guide portion orthogonal plane Sx, may be defined in the same manner as that of the first embodiment as the tangent line to the curve that smoothly connects breakpoints of the plurality of straight lines.

In the case where the guide portion 33 of the second embodiment is used, at the time of inserting the pump unit 20 into the fuel tank 80, the worker inserts the pump unit 20 while changing the insertion angle in a stepwise manner in response to the movement of the straight line segments of the guide portion 33 to be guided. Therefore, as the advantage (3) of the second embodiment in place of the advantage (2) of the first embodiment, the worker can perceive the degree of insertion sensuously step-by-step.

The second embodiment implements the effects and advantages, which are similar to those of the first embodiment.

OTHER EMBODIMENTS (a) In the above embodiments, the longitudinal direction of the pump unit 20 is parallel with the rotation plane of the stay 45. Alternatively, in another embodiment, the longitudinal direction of the pump unit may not be strictly parallel to the rotation plane of the stay but may be somewhat tilted. In the claim, it is recited that "the pump unit is configured such that a longitudinal direction of the pump unit coincides with a direction along a rotation plane of the stay." This sentence should be interpreted such that the positional relationship between the pump unit and the rotation plane of the stay is not necessarily limited to parallel but is interpreted to broadly include "direction along".

(b) The fuel supply device may not have the other members, such as the relief valve and the wire harness, which are recited in the above embodiments and are other than the base portion, the fuel pump and the insertion guide member as the constituent elements of the pump unit. Furthermore, the fuel supply device may not include the sender gauge.

Conversely, other elements, which are not included in the above embodiments, may be added to the fuel supply device.

(c) In the above-described method for mounting and demounting the fuel supply device, for the sake of convenience, it is described that the opening plane So and the bottom surface 82 of the fuel tank 80 are placed parallel to the horizontal plane. However, depending on the shape of the fuel tank, the opening plane and the bottom surface of the fuel tank may not be parallel to the horizontal plane. Furthermore, under the assumption of that the fuel tank is mounted on the vehicle, the horizontal direction is not uniformly determined when the vehicle itself is placed on the inclined surface. Even in such a case, according to the above examples, the direction perpendicular to the opening plane may be regarded as the inserting direction of the fuel supply device.

(d) In the above-described method for mounting and demounting the fuel supply device, with respect FIG. 6, which is the projection view in the longitudinal direction of the pump unit 20, it is assumed that the stopper portion 31 of the insertion guide member 30 protrudes outward from the imaginary circle that has the opening portion's inner diameter Do.

In contrast to this, it may be assumed that the insertion guide member 30 is entirely received within the imaginary circle that has the opening portion's inner diameter Do, and thereby there is no projecting part that functions as the stopper portion. Even in such a case, the worker can rotate the pump unit 20 through use of the guide function by placing the fuel supply device 10 to one side of the opening portion 81 such that the guide portion 32 is in contact with the edge part of the opening portion 81. The method for mounting and demounting the fuel supply device according to the present disclosure includes the method in such a case.

(e) The fuel supply device is not limited to the fuel supply device installed to the vehicle but may be a fuel supply device used in another type of transport (e.g., an airplane, a ship) or in another application that is other than the transport.

The present disclosure should not be limited to the above embodiments at all and may be implemented in various modes without departing from the scope of the present disclosure.

The invention claimed is:

1. A fuel supply device configured to be mounted in an inside of a fuel tank, the fuel supply device comprising:
   a flange that is fittable to an opening portion of the fuel tank and has a fitting portions diameter that corresponds to an inner diameter of the opening portion;
   a pump unit that includes a base portion and a fuel pump, wherein the fuel pump is mounted to the base portion;
   a stay that is fixed to the flange; and
   a coupling shaft that couples between the stay and the pump unit in a manner that enables relative rotation between the stay and the pump unit, wherein:
   the stay is rotatable between:
      an upright state where the stay is held upright relative to the base portion of the pump unit, and the flange is farthest from the base portion; and
      a maximum tilt state where the stay is closest to the base portion of the pump unit;
   the pump unit is configured such that a longitudinal direction of the pump unit coincides with a direction along a rotation plane of the stay, and the pump unit further includes an insertion guide member that extends in the longitudinal direction and is used to guide the pump unit at a time of inserting the pump unit into the opening portion of the fuel tank;
   the insertion guide member includes:
      a stopper portion, wherein when the pump unit is projected in the longitudinal direction onto a plane of projection, the stopper portion protrudes outward from an imaginary circle, which has the fitting portion's diameter, on the plane of projection; and
      a guide portion that guides the pump unit in a rotational direction of the pump unit relative to the stay, while the stopper portion and the guide portion are arranged along an edge part of the insertion guide member, which is opposite from the base portion;
   an imaginary plane, which is perpendicular to a tangent line at a point along the guide portion and extends through the point and intersects with the base portion at an angle corresponding to a tilt angle of the stay in the maximum tilt state, is defined as a guide portion orthogonal plane; and
   a cross section of the pump unit taken along the guide portion orthogonal plane is set to be within the imaginary circle, which has the fitting portion's diameter.

2. The fuel supply device according to claim 1, wherein an outline of the guide portion is formed by a curve line.

3. The fuel supply device according to claim 1, wherein an outline of the guide portion is formed by a combination of a plurality of straight lines, slopes of which change progressively.

4. The fuel supply device according to claim 1, wherein:
   the pump unit further includes a relief valve that adjusts a discharge pressure of the fuel pump; and
   the relief valve is placed on an opposite side of the stopper portion of the insertion guide member, which is opposite from the guide portion.

5. The fuel supply device according to claim 1, wherein the stay is tilted on the base portion side of the guide portion in the maximum tilt state.

6. The fuel supply device according to claim 5, wherein:
   a wire harness, which transmits a signal, is placed along the stay; and
   at least a portion of the wire harness, which is rotatable together with the stay, is placed on the base portion side of the guide portion in the maximum tilt state.

7. The fuel supply device according to claim 1, wherein the guide portion is placed on the coupling shaft side of a center of the pump unit, which is centered in the longitudinal direction of the pump unit.

8. The fuel supply device according to claim 7, further comprising a connection tube that forms a fuel passage, wherein at least a portion of the connection tube extends on an opposite side of the guide portion of the insertion guide member, which is opposite from the center of the pump unit that is centered in the longitudinal direction of the pump unit.

9. The fuel supply device according to claim 1, further comprising a sender gauge that is configured to sense a level of a surface of fuel in a state where the sender gauge is placed in the inside of the fuel tank, wherein:
   the sender gauge is placed such that a clearance between the sender gauge and a bottom surface of the fuel tank and a clearance between the sender gauge and an inner side surface of the fuel tank are ensured in a state where the fuel tank is in parallel with a horizontal plane while the guide portion is in contact with an edge part of the opening portion.

10. A method for mounting and demounting a fuel supply device relative to a fuel tank, wherein the fuel supply device includes:
   a flange that is fittable to an opening portion of the fuel tank and has a fitting portion's diameter that corresponds to an inner diameter of the opening portion;
   a pump unit that includes a base portion and a fuel pump, wherein the fuel pump is mounted to the base portion;
   a stay that is fixed to the flange; and
   a coupling shaft that couples between the stay and the pump unit in a manner that enables relative rotation between the stay and the pump unit, wherein:
   the stay is rotatable between:
      an upright state where the stay is held upright relative to the base portion of the pump unit, and the flange is farthest from the base portion; and
      a maximum tilt state where the stay is closest to the base portion of the pump unit;
   the pump unit is configured such that a longitudinal direction of the pump unit coincides with a direction along a rotation plane of the stay, and the pump unit further includes an insertion guide member that extends in the longitudinal direction and is used to guide the pump unit at a time of inserting the pump unit into the opening portion of the fuel tank;
   the insertion guide member includes a guide portion that guides the pump unit in a rotational direction of the pump unit relative to the stay, while the guide portion is arranged along an edge part of the insertion guide member, which is opposite from the base portion;
   an imaginary plane, which is perpendicular to a tangent line at a point along the guide portion and extends through the point and intersects with the base portion at an angle corresponding to a tilt angle of the stay in the maximum tilt state, is defined as a guide portion orthogonal plane; and
   a cross section of the pump unit taken along the guide portion orthogonal plane is set to be within the imaginary circle, which has the fitting portion's diameter, the method comprising, at a time of mounting the fuel supply device to the fuel tank:
  inserting the pump unit into the opening portion in a perpendicular direction, which is perpendicular to an opening plane of the opening portion, while the stay is placed in the maximum tilt state;
  rotating the pump unit in a direction for placing the base portion in a state, in which the base portion is opposed to a bottom surface of the fuel tank, while the guide portion of the insertion guide member is in contact with an edge part of the opening portion; and
  fitting the flange to the opening portion; and
the method comprising, at a time of demounting the fuel supply device from the fuel tank:
  pulling up the flange until the guide portion of the insertion guide member contacts the edge part of the opening portion;
  rotating the pump unit in a direction for raising the pump unit from the bottom surface of the fuel tank while the guide portion of the insertion guide member is in contact with the edge part of the opening portion; and
  pulling up the pump unit in the perpendicular direction, which is perpendicular to the opening plane of the opening portion.

* * * * *